US010191135B2

(12) United States Patent
Yang et al.

(10) Patent No.: US 10,191,135 B2
(45) Date of Patent: Jan. 29, 2019

(54) WIRELESS NETWORK-BASED POSITIONING METHOD AND POSITIONING APPARATUS (71) Applicant: HUAWEI TECHNOLOGIES CO., LTD., Shenzhen, Guangdong (CN)

(72) Inventors: Xun Yang, Shenzhen (CN); Yanping Jiang, Shenzhen (CN); Hui Yang, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/942,145

(22) Filed: Mar. 30, 2018

(65) Prior Publication Data

US 2018/0246184 A1 Aug. 30, 2018

Related U.S. Application Data (63) Continuation of application No. PCT/CN2016/099820, filed on Sep. 23, 2016.

(30) Foreign Application Priority Data

Sep. 30, 2015 (CN) .......................... 2015 1 0642053

(51) Int. Cl.
*G01S 1/20* (2006.01)
*H04W 4/02* (2018.01)
(Continued)

(52) U.S. Cl.
CPC .............. *G01S 1/20* (2013.01); *G01S 5/0252* (2013.01); *G01S 5/06* (2013.01); *G01S 5/14* (2013.01);
(Continued)

(58) Field of Classification Search
CPC ....................................................... G01S 1/20
(Continued)

(56) References Cited

U.S. PATENT DOCUMENTS

| 7,006,838 | B2 | 2/2006 | Diener et al. |
| 8,233,457 | B1 | 7/2012 | Chen et al. |
| 2014/0045522 | A1 | 2/2014 | Sugar et al. |

FOREIGN PATENT DOCUMENTS

| CN | 102455421 A | 5/2012 |
| CN | 103561387 A | 2/2014 |
| WO | 2004019559 A2 | 3/2004 |

OTHER PUBLICATIONS

"Yilin Zhao:"Standardization of Mobile Phone Positioning for 3G Systems", IEEE Communications Magazine, IEEE Service Center. Piscataway, US, vol. 40, No. 7, Jul. 1, 2002, pp. 108-116. XP011092889".

(Continued)

*Primary Examiner* — Joel Ajayi
(74) *Attorney, Agent, or Firm* — Womble Bond Dickinson (US) LLP (57) ABSTRACT

The present disclosure provides a wireless network-based positioning method and positioning apparatus. The positioning method includes: obtaining time information used for determining a current location of a to-be-positioned node, where the time information records times of arrival of a first sounding signal; determining time differences of arrival of the first sounding signal at the at least three anchor nodes according to recorded historical information and the time information; and determining the current location of the to-be-positioned node according to locations of the at least three anchor nodes and the time differences of arrival of the first sounding signal at the at least three anchor nodes. By means of the present disclosure, time differences of arrival of a sounding signal at different anchor nodes can be accurately determined, thereby determining an accurate location of a to-be-positioned node and avoiding synchronization between the anchor nodes.

15 Claims, 4 Drawing Sheets (51) Int. Cl.
  *H04W 64/00* (2009.01)
  *G01S 5/06* (2006.01)
  *G01S 5/02* (2010.01)
  *G01S 5/14* (2006.01)

(52) U.S. Cl.
  CPC ............ *H04W 4/02* (2013.01); *H04W 64/00* (2013.01); *H04W 64/003* (2013.01)

(58) Field of Classification Search
  USPC ...................................................... 455/456.1
  See application file for complete search history.

(56) References Cited

OTHER PUBLICATIONS

Krizman K J et al:"Wireless Position Location:Fundamentals, Implementation Strategiesand Sources of Error", 1997 IEEE 47th. Vehicular Technology Conference.Phoenix, May 4-7, 1997; [IEEE Vehicular Technology Conference], vol. Con F. 47, May 4, 1997, pp. 919-923, XP000736742.
Rick Roberts:"Nov. 2004 IEEE P802 .15-04-0581r7 IEEE P802.15 Wireless Personal Area Networks Project IEEE P802.15 Working Group for Wireless Personal Area Networks (WPANs)Title Ranging Subcommittee Final Report", Nov. 1, 2004, pp. 1-37, XP55400179.
Bin Xu et al., High-Accuracy TDOA-Based Localization without Time Synchronization. IEEE Transactions on Parallel and Distributed Systems, vol. 24, No. 8, Aug. 2013, 10 pages.

FIG. 6

WIRELESS NETWORK-BASED POSITIONING METHOD AND POSITIONING APPARATUS

CROSS-REFERENCE TO RELATED APPLICATIONS

This application is a continuation of International Application No. PCT/CN2016/099820, filed on Sep. 23, 2016, which claims priority to Chinese Patent Application No. 201510642053.8, filed on Sep. 30, 2015. The disclosures of the aforementioned applications are hereby incorporated by reference in their entireties.

TECHNICAL FIELD

The present disclosure relates to the positioning field, and more specifically, to a wireless network-based positioning method and positioning apparatus.

BACKGROUND

Currently, there are mainly two time measurement-based positioning methods: a time of arrival (TOA)-based positioning method and a time difference of arrival (TDOA)-based positioning method. The TOA-based positioning method needs to ensure strict synchronization not only between a to-be-positioned node and an anchor node but also between anchor nodes, while the TDOA-based positioning method needs to ensure strict synchronization only between anchor nodes. However, in many wireless networks, it is very difficult to achieve strict synchronization between anchor nodes. As a result, the TDOA-based positioning method cannot be used in an asynchronous environment.

SUMMARY

Embodiments of the present disclosure provide a wireless network-based positioning method and positioning apparatus, so as to implement positioning by using TDOAs in an asynchronous environment.

According to a first aspect, a wireless network-based positioning method is provided, including: obtaining time information used for determining a current location of a to-be-positioned node, where the time information records times of arrival of a first sounding signal at at least three anchor nodes, and the first sounding signal is sent by the to-be-positioned node at the current location; determining time differences of arrival of the first sounding signal at the at least three anchor nodes according to recorded historical information and the time information, where the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is sent by the to-be-positioned node before the to-be-positioned node sends the first sounding signal; and determining the current location of the to-be-positioned node according to the locations of the at least three anchor nodes and the time differences of arrival of the first sounding signal at the at least three anchor nodes.

With reference to the first aspect, in an implementation of the first aspect, the determining time differences of arrival of the first sounding signal at the at least three anchor nodes according to recorded historical information and the time information includes: determining distances between the to-be-positioned node at the historical location and the at least three anchor nodes according to the historical location and the locations of the at least three anchor nodes; and determining a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

where $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the location at which the to-be-positioned node sends the second sounding signal and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

With reference to the first aspect or the foregoing implementation of the first aspect, in another implementation of the first aspect, the determining the current location of the to-be-positioned node according to the locations of the at least three anchor nodes and the time differences of arrival of the first sounding signal at the at least three anchor nodes includes: determining the current location of the to-be-positioned node according to formulas $$\begin{cases} \sqrt{(x-x_A)^2+(y-y_A)^2} - \sqrt{(x-x_B)^2+(y-y_B)^2} = c \cdot T_{AB} \\ \sqrt{(x-x_B)^2+(y-y_B)^2} - \sqrt{(x-x_C)^2+(y-y_C)^2} = c \cdot T_{BC} \end{cases},$$

where $(x_A, y_A)$, $(x_B, y_B)$, and $(x_C, Y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, (x, y) represents the current location of the to-be-positioned node, and c represents the propagation velocity of the sounding signal sent by the to-be-positioned node.

With reference to any one of the first aspect or the foregoing implementations of the first aspect, in another implementation of the first aspect, the positioning method is performed by the to-be-positioned node, and the positioning method further includes: sending, by the to-be-positioned node, the first sounding signal to the at least three anchor nodes; and the obtaining time information used for determining a current location of a to-be-positioned node includes: receiving, by the to-be-positioned node, the time information fed back by the at least three anchor nodes.

With reference to any one of the first aspect or the foregoing implementations of the first aspect, in another implementation of the first aspect, the positioning method is performed by a third-party device other than the to-bepositioned node, and the obtaining time information used for determining a current location of a to-be-positioned node includes: receiving, by the third-party device, the time information fed back by the at least three anchor nodes; and the positioning method further includes: sending, by the third-party device, the determined current location to the to-be-positioned node.

With reference to any one of the first aspect or the foregoing implementations of the first aspect, in another implementation of the first aspect, a time of arrival of the first sounding signal at any one of the at least three anchor nodes is calculated based on a time at which the any anchor node obtains the first sounding signal and a time period required for radio frequency processing and baseband processing of the any anchor node.

According to a second aspect, a wireless network-based positioning apparatus is provided, including: an obtaining module, configured to obtain time information used for determining a current location of a to-be-positioned node, where the time information records times of arrival of a first sounding signal at at least three anchor nodes, and the first sounding signal is sent by the to-be-positioned node at the current location; a first determining module, configured to determine time differences of arrival of the first sounding signal at the at least three anchor nodes according to recorded historical information and the time information, where the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is previously sent by the to-be-positioned node; and a second determining module, configured to determine the current location of the to-be-positioned node according to the locations of the at least three anchor nodes and the time differences of arrival of the first sounding signal at the at least three anchor nodes.

With reference to the second aspect, in an implementation of the second aspect, the first determining module is specifically configured to: determine distances between the to-be-positioned node at the historical location and the at least three anchor nodes according to the historical location and the locations of the at least three anchor nodes; and determine a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

where $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the to-be-positioned node at the historical location and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

With reference to the second aspect or the foregoing implementation of the second aspect, in another implementation of the second aspect, the second determining module is specifically configured to: determine the current location of the to-be-positioned node according to formulas $$\begin{cases} \sqrt{(x-x_A)^2 + (y-y_A)^2} - \sqrt{(x-x_B)^2 + (y-y_B)^2} = c \cdot T_{AB} \\ \sqrt{(x-x_B)^2 + (y-y_B)^2} - \sqrt{(x-x_C)^2 + (y-y_C)^2} = c \cdot T_{BC} \end{cases},$$

where $(x_A, y_A)$, $(x_B, y_B)$, and $(x_C, y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, (x, y) represents the current location of the to-be-positioned node, and c represents the propagation velocity of the sounding signal sent by the to-be-positioned node.

With reference to any one of the second aspect or the foregoing implementations of the second aspect, in another implementation of the second aspect, the positioning apparatus is the to-be-positioned node, and the positioning apparatus further includes a transmission module; the transmission module is configured to send the first sounding signal to the at least three anchor nodes; and the obtaining module is specifically configured to receive the time information fed back by the at least three anchor nodes.

With reference to any one of the second aspect or the foregoing implementations of the second aspect, in another implementation of the second aspect, the positioning apparatus is a third-party device other than the to-be-positioned node, and the positioning apparatus further includes a transmission module; the obtaining module is specifically configured to receive the time information fed back by the at least three anchor nodes; and the transmission module is configured to send the determined current location to the to-be-positioned node.

With reference to any one of the second aspect or the foregoing implementations of the second aspect, in another implementation of the second aspect, a time of arrival of the first sounding signal at any one of the at least three anchor nodes is calculated based on a time at which the any anchor node obtains the first sounding signal and a time period required for radio frequency processing and baseband processing of the any anchor node.

According to a third aspect, a wireless network-based positioning apparatus is provided, including: a receiver, configured to obtain time information used for determining a current location of a to-be-positioned node, where the time information records times of arrival of a first sounding signal at at least three anchor nodes, and the first sounding signal is sent by the to-be-positioned node at the current location; and a processor, configured to determine time differences of arrival of the first sounding signal at the at least three anchor nodes according to recorded historical information and the time information, where the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is previously sent by the to-be-positioned node, where the processor is further configured to determine the current location of the to-be-positioned node according to the locations of the at least three anchor nodes and the time differences of arrival of the first sounding signal at the at least three anchor nodes.

With reference to the third aspect, in an implementation of the third aspect, the processor is specifically configured to: determine distances between the to-be-positioned node at the historical location and the at least three anchor nodes according to the historical location and the locations of the at least three anchor nodes; and determine a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

where $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the to-be-positioned node at the historical location and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

With reference to the third aspect or the foregoing implementation of the third aspect, in another implementation of the third aspect, the processor is specifically configured to: determine the current location of the to-be-positioned node according to formulas $$\begin{cases} \sqrt{(x-x_A)^2 + (y-y_A)^2} - \sqrt{(x-x_B)^2 + (y-y_B)^2} = c \cdot T_{AB} \\ \sqrt{(x-x_B)^2 + (y-y_B)^2} - \sqrt{(x-x_C)^2 + (y-y_C)^2} = c \cdot T_{BC} \end{cases},$$

where $(x_A, y_A)$, $(x_B, y_B)$, and $(x_C, y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, (x, y) represents the current location of the to-be-positioned node, and c represents the propagation velocity of the sounding signal sent by the to-be-positioned node.

With reference to any one of the third aspect or the foregoing implementations of the third aspect, in another implementation of the third aspect, the positioning apparatus is the to-be-positioned node, and the positioning apparatus further includes a transmitter; the transmitter is configured to send the first sounding signal to the at least three anchor nodes; and the receiver is specifically configured to receive the time information fed back by the at least three anchor nodes.

With reference to any one of the third aspect or the foregoing implementations of the third aspect, in another implementation of the third aspect, the positioning apparatus is a third-party device other than the to-be-positioned node, and the positioning apparatus further includes a transmitter; the receiver is specifically configured to receive the time information fed back by the at least three anchor nodes; and the transmitter is configured to send the determined current location to the to-be-positioned node.

With reference to any one of the third aspect or the foregoing implementations of the third aspect, in another implementation of the third aspect, a time of arrival of the first sounding signal at any one of the at least three anchor nodes is calculated based on a time at which the any anchor node obtains the first sounding signal and a time period required for radio frequency processing and baseband processing of the any anchor node.

In the embodiments of the present disclosure, the time differences of arrival of the sounding signal, sent by the to-be-positioned node, at the different anchor nodes can be accurately determined according to the times of arrival of the sounding signal at the different anchor nodes and the historical information of the to-be-positioned node, thereby determining a location of the to-be-positioned node. Compared with the prior art in which accurate positioning can be implemented only by ensuring strict synchronization between anchor nodes, accurate positioning can be performed by using TDOAs when the anchor nodes are asynchronous.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
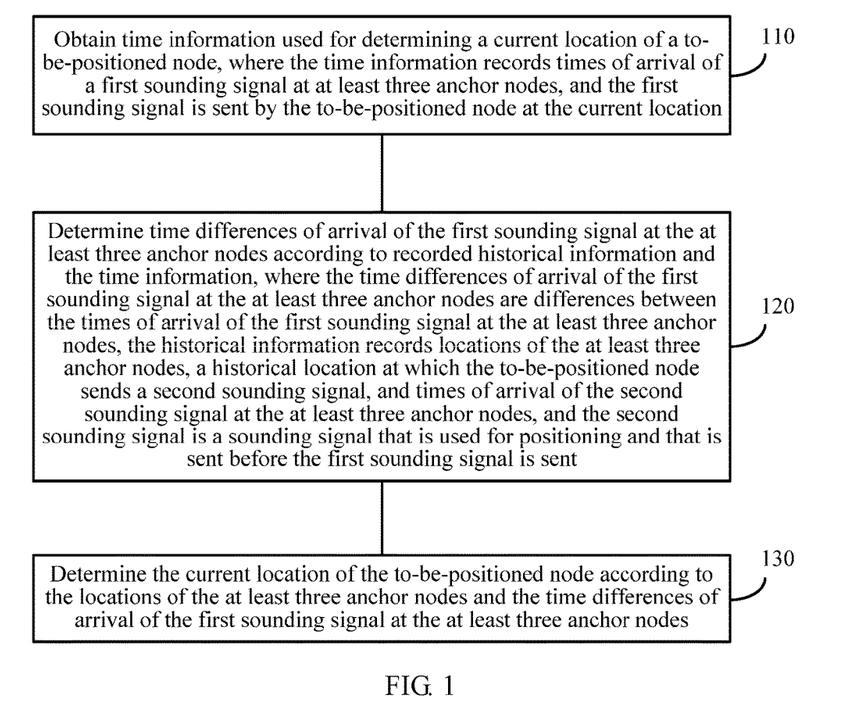
FIG. 1 is a schematic flowchart of a wireless network-based positioning method according to an embodiment of the present disclosure.

FIG. 1 is a schematic flowchart of a wireless network-based positioning method according to an embodiment of the present disclosure. The positioning method may be performed by a device on a to-be-positioned node side, a device on an anchor node side, or a third-party independent device other than a device on a to-be-positioned node side or an anchor node side. The positioning method in FIG. 1 includes the following steps.

At 110, time information used for determining a current location of a to-be-positioned node is obtained, where the time information records times of arrival of a first sounding signal at at least three anchor nodes, and the first sounding signal is sent by the to-be-positioned node at the current location.

It should be understood that the at least three anchor nodes may be asynchronous in time. Therefore, the times of arrival of the first sounding signal at the at least three anchor nodes are respective local times of the anchor nodes. The time information used for determining the current location of the to-be-positioned node may be obtained in multiple manners. For example, the time information may be obtained by receiving messages fed back by the anchor nodes, or the time information may be obtained from a third-party device after the third-party device obtains messages fed back by the anchor nodes. In addition, a location of the to-be-positioned node may always change.

At 120, time differences of arrival of the first sounding signal are determined at the at least three anchor nodes according to recorded historical information and the time information, where the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is sent before the first sounding signal is sent.

It should be understood that the time differences of arrival of the first sounding signal at the at least three anchor nodes include a time difference of arrival of the first sounding signal at any two of the at least three anchor nodes. For example, when the at least three anchor nodes include a first anchor node, a second anchor node, and a third anchor node, the time differences include a time difference of arrival of the first sounding signal at the first anchor node and the second anchor node, a time difference of arrival of the first sounding signal at the first anchor node and the third anchor node, and a time difference of arrival of the first sounding signal at the second anchor node and the third anchor node. The historical information and the currently obtained time information may be stored on the to-be-positioned node side, may be stored in the third-party device, or may be stored on the anchor node side. Location information, recorded in the historical information, of the anchor nodes and the to-be-positioned node may be in a form of coordinates or may be in another form. In addition, the location information may be distances between the to-be-positioned node and the anchor nodes.

At 130, the current location of the to-be-positioned node is determined according to the locations of the at least three anchor nodes and the time differences of arrival of the first sounding signal at the at least three anchor nodes.

Herein, a process of each time of positioning calculation may be referred to as a positioning cycle, and the to-be-positioned node may send only one sounding signal within one positioning cycle. It is assumed that the to-be-positioned node sends the first sounding signal within a first positioning cycle and sends the second sounding signal within a second positioning cycle. If the first positioning cycle is a current positioning cycle, the second positioning cycle may be before the first positioning cycle. In this case, time differences of arrival of a sounding signal at different anchor nodes may be calculated according to time information obtained within the first positioning cycle and historical information recorded within the second positioning cycle.

Then, the location of the to-be-positioned node is determined according to the time differences. More preferably, the second positioning cycle is a previous positioning cycle of the first positioning cycle. Therefore, after sending the second sounding signal and completing positioning, the to-be-positioned node immediately sends the first sounding signal to the anchor nodes. In this case, used historical information is just recorded in the last positioning cycle. Therefore, an obtained positioning result is relatively accurate.

Optionally, in an embodiment, the to-be-positioned node may send a sounding signal to the anchor nodes by means of broadcast.

In this embodiment of the present disclosure, the time differences of arrival of the sounding signal, sent by the to-be-positioned node, at the different anchor nodes can be accurately determined according to the times of arrival of the sounding signal at the different anchor nodes and the historical information of the to-be-positioned node, thereby determining the location of the to-be-positioned node. Compared with the prior art in which accurate positioning can be implemented only by ensuring strict synchronization between anchor nodes, accurate positioning can be performed by using TDOAs when the anchor nodes are asynchronous.

Figure 2:
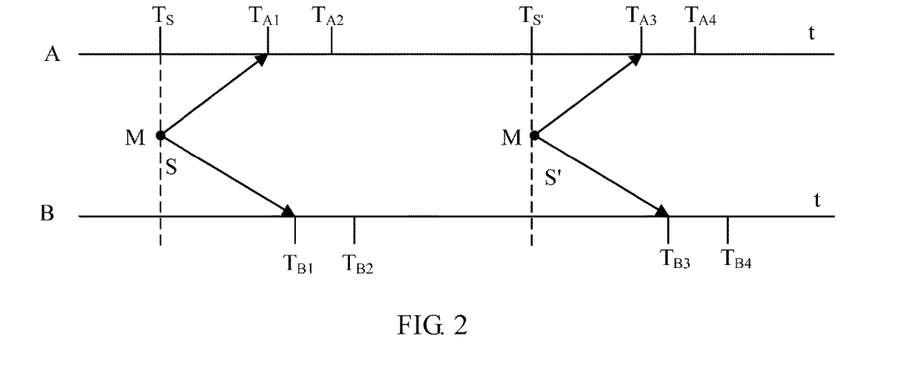
FIG. 2 is a schematic principle diagram of a wireless network-based positioning method according to an embodiment of the present disclosure.

FIG. 2 is a schematic principle diagram of a wireless network-based positioning method according to an embodiment of the present disclosure. As shown in FIG. 2, A and B are anchor nodes, M is a to-be-positioned node, two horizontal lines are respective time axes of the anchor node A and the anchor node B respectively, and times at which the anchor node A and the anchor node B receive a sounding signal are respective local times of the anchor nodes. The to-be-positioned node M sends a first sounding signal S' to the anchor node A and the anchor node B at a current moment Ts', and times of arrival of the first sounding signal S' at the anchor node A and the anchor node B are $T_{A3}$ and $T_{B3}$ respectively. It should be understood that $T_{A3}$ and $T_{B3}$ are local times of the anchor node A and the anchor node B respectively. Before the current moment Ts', the to-be-positioned node M further sends a second sounding signal S to the anchor node A and the anchor node B, and times of arrival of the second sounding signal S at the anchor node A and the anchor node B are $T_{A1}$ and $T_{B1}$ respectively. Similarly, $T_{A1}$ and $T_{B1}$ are also local times of the anchor node A and the anchor node B respectively. It can be learned from FIG. 2 that a time difference of arrival of the first sounding signal S' at the anchor node A and the anchor node B is $T_{AB} = T_{B3} - T_{A3}$. If the anchor node A and the anchor node B are synchronous in time, the time difference of arrival of the first sounding signal S' at the anchor node A and the anchor node B can be directly determined by using the formula. However, if the anchor node A and the anchor node B are asynchronous, such calculation is inaccurate. To calculate a time difference that exists when the anchor nodes are asynchronous in time, the formula is further derived according to FIG. 2 herein, and a specific derivation process is as follows:

$$T_{AB} = T_{B3} - T_{A3}$$

$$= (T_{B3} - T_S) - (T_{A3} - T_S)$$
$$= (T_{B3} - T_{B1}) + (T_{B1} - T_S) - (T_{A3} - T_{A1}) - (T_{A1} - T_S)$$
$$= (T_{B1} - T_S) - (T_{A1} - T_S) + (T_{B3} - T_{B1}) - (T_{A3} - T_{A1})$$
$$= \frac{1}{c}(L_B - L_A) + (T_{B3} - T_{B1}) - (T_{A3} - T_{A1}),$$

where c is a propagation velocity of a sounding signal sent by the to-be-positioned node, and $L_A$ and $L_B$ represent distances respectively between the to-be-positioned node M and the anchor node A and between the to-be-positioned node M and the anchor node B when the to-be-positioned node M sends the first sounding signal S'.

Similarly, when there is a third anchor node C, a time difference $T_{AC}$ of arrival of the first sounding signal S' at the anchor node A and the anchor node C or a time difference $T_{BC}$ of arrival of the first sounding signal S' at the anchor node B and the anchor node C may be further calculated according to the foregoing formula. After at least two pieces of time difference information are obtained, a current location of the to-be-positioned node can be calculated according to time differences of arrival of a sounding signal at different anchor nodes. In this way, when the anchor nodes are asynchronous, time differences of arrival of the first sounding signal S', sent by the to-be-positioned node, at different anchor nodes can be accurately calculated according to distances between a historical location of the to-be-positioned node and the anchor nodes and times of arrival of the first sounding signal S' and the second sounding signal S at the anchor nodes, thereby accurately positioning the to-be-positioned node when the anchor nodes are asynchronous.

Optionally, in an embodiment, during the determining time differences of arrival of the first sounding signal at the at least three anchor nodes according to recorded historical information and the time information, the following method may be used for calculation. Specific steps are as follows:

First, distances between the to-be-positioned node at the historical location and the at least three anchor nodes are determined according to the historical location at which the to-be-positioned node sends the second sounding signal and the locations of the at least three anchor nodes.

Then, a time difference of arrival of the first sounding signal at any two of the at least three anchor nodes is determined according to a formula $$T_{AB} = \frac{1}{c}(L_B - L_A) + (T_{B3} - T_{B1}) - (T_{A3} - T_{A1}),$$

where $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the location at which the to-be-positioned node sends the second sounding signal and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

Optionally, in an embodiment, when the at least three anchor nodes include four anchor nodes, for example, when the at least three anchor nodes include a first anchor node, a second anchor node, a third anchor node, and a fourth anchor node, the formula $$T_{AB} = \frac{1}{c}(L_B - L_A) + (T_{B3} - T_{B1}) - (T_{A3} - T_{A1}),$$

may be used to determine a first time difference of arrival of the first sounding signal at the first anchor node and the second anchor node and a second time difference of arrival of the first sounding signal at the third anchor node and the fourth anchor node. Next, the current location of the to-be-positioned node may be determined by using the first time difference, the second time difference, and locations of the first anchor node, the second anchor node, the third anchor node, and the fourth anchor node.

Preferably, in an embodiment, the current location of the to-be-positioned node may be determined by using location information of three of the at least three anchor nodes and time information of arrival of the first sounding signal at the three anchor nodes. Specifically, when the at least three anchor nodes include a first anchor node, a second anchor node, and a third anchor node, the formula $$T_{AB} = \frac{1}{c}(L_B - L_A) + (T_{B3} - T_{B1}) - (T_{A3} - T_{A1})$$

may be used to determine a first time difference of arrival of the first sounding signal at the first anchor node and the second anchor node, a second time difference of arrival of the first sounding signal at the first anchor node and the third anchor node, and a third time difference of arrival of the first sounding signal at the second anchor node and the third anchor node. The current location of the to-be-positioned node can be calculated by using any two of the first time difference, the second time difference, and the third time difference in combination with locations of the first anchor node, the second anchor node, and the third anchor node.

Specifically, $T_{AB}$ and $T_{BC}$ may be determined according to formulas $$\begin{cases} T_{AB} = \frac{1}{c}(L_B - L_A) + (T_{B3} - T_{B1}) - (T_{A3} - T_{A1}) \\ T_{BC} = \frac{1}{c}(L_C - L_B) + (T_{C3} - T_{C1}) - (T_{B3} - T_{B1}) \end{cases},$$

where $T_{AB}$ represents a time difference of arrival of the first sounding signal at the first anchor node and the second anchor node, $T_{BC}$ represents a time difference of arrival of the first sounding signal at the second anchor node and the third anchor node, $L_A$, $L_B$, and $L_C$ respectively represent distances between the location at which the to-be-positioned node sends the second sounding signal and the first anchor node, the second anchor node, and the third anchor node, $T_{A1}$, $T_{B1}$ and $T_{C1}$ respectively represent times of arrival of the second sounding signal at the first anchor node, the second anchor node, and the third anchor node, $T_{A3}$, $T_{B3}$, and $T_{C3}$ respectively represent times of arrival of the first sounding signal at the first anchor node, the second anchor node, and the third anchor node, and c represents the propagation velocity of the sounding signal sent by the to-be-positioned node. Then, the current location of the to-be-positioned node can be determined according to $T_{AB}$ and $T_{BC}$.

Optionally, in another embodiment, after the time differences of arrival of the first sounding signal at the at least three anchor nodes are determined, the current location of the to-be-positioned node may be determined according to the time differences and the locations of the at least three anchor nodes.

Specifically, the current location of the to-be-positioned node may be determined according to formulas $$\begin{cases} \sqrt{(x-x_A)^2+(y-y_A)^2} - \sqrt{(x-x_B)^2+(y-y_B)^2} = c \cdot T_{AB} \\ \sqrt{(x-x_B)^2+(y-y_B)^2} - \sqrt{(x-x_C)^2+(y-y_C)^2} = c \cdot T_{BC} \end{cases},$$

where $(x_A, y_A)$, $(x_B, y_B)$, and $(x_C, y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, (x, y) represents the current location of the to-be-positioned node, and c represents the propagation velocity of the sounding signal sent by the to-be-positioned node.

It should be understood that the foregoing only describes an example of calculating the current location of the to-be-positioned node by using location information of three anchor nodes and time difference information of arrival of a sounding signal at different anchor nodes. Similarly, when there are more than three anchor nodes, the current location of the to-be-positioned node may also be calculated by using location information of the anchor nodes and time difference information of arrival of a sounding signal at different anchor nodes.

Optionally, in an embodiment, when there are four anchor nodes, for example, when there are a first anchor node, a second anchor node, a third anchor node, and a fourth anchor node, the current location of the to-be-positioned node may be determined according to formulas $$\begin{cases} \sqrt{(x-x_A)^2+(y-y_A)^2} - \sqrt{(x-x_B)^2+(y-y_B)^2} = c \cdot T_{AB} \\ \sqrt{(x-x_C)^2+(y-y_C)^2} - \sqrt{(x-x_D)^2+(y-y_D)^2} = c \cdot T_{CD} \end{cases},$$

where $(x_A, Y_A)$, $(x_B, y_B)$, $(x_C, Y_C)$, and $(x_D, Y_D)$ respectively represent locations of the first anchor node, the second anchor node, the third anchor node, and the fourth anchor node in the at least three anchor nodes, $T_{AB}$ represents a time difference of arrival of the first sounding signal at the first anchor node and the second anchor node, $T_{CD}$ represents a time difference of arrival of the first sounding signal at the third anchor node and the fourth anchor node, (x, y) represents the current location of the to-be-positioned node, and c represents the propagation velocity of the sounding signal sent by the to-be-positioned node.

Optionally, in an embodiment, when the positioning method is performed by the to-be-positioned node, the positioning method further includes: sending, by the to-be-positioned node, the first sounding signal to the at least three anchor nodes; and receiving, by the to-be-positioned node, the time information fed back by the at least three anchor nodes. It should be understood that the receiving, by the to-be-positioned node, the time information fed back by the at least three anchor nodes may be separately receiving time information fed back by each of the at least three anchor nodes, or may be receiving time information fed back by a primary anchor node in the at least three anchor nodes. In this case, the time information fed back by the primary anchor node includes a time of arrival of the first sounding signal at each of the at least three anchor nodes. After receiving the time information fed back by the anchor nodes, the to-be-positioned node may calculate the current location of the to-be-positioned node according to the historical information previously stored by the to-be-positioned node and the time information. After obtaining information about the current location, the to-be-positioned node needs to save the information about the current location, and display the information about the current location in real time according to a requirement, or send the information about the current location to another device.

Optionally, in an embodiment, in a wireless local area network (WLAN), the to-be-positioned node may send a sounding signal by using an existing frame or by using a particular frame to an anchor node. For example, the to-be-positioned node may send a sounding signal to an anchor node by using a probe request command, and when sending the sounding signal by using the command, may add a positioning indicator bit to the signal to identify that the currently sent signal is a sounding signal used for positioning.

Figure 3:
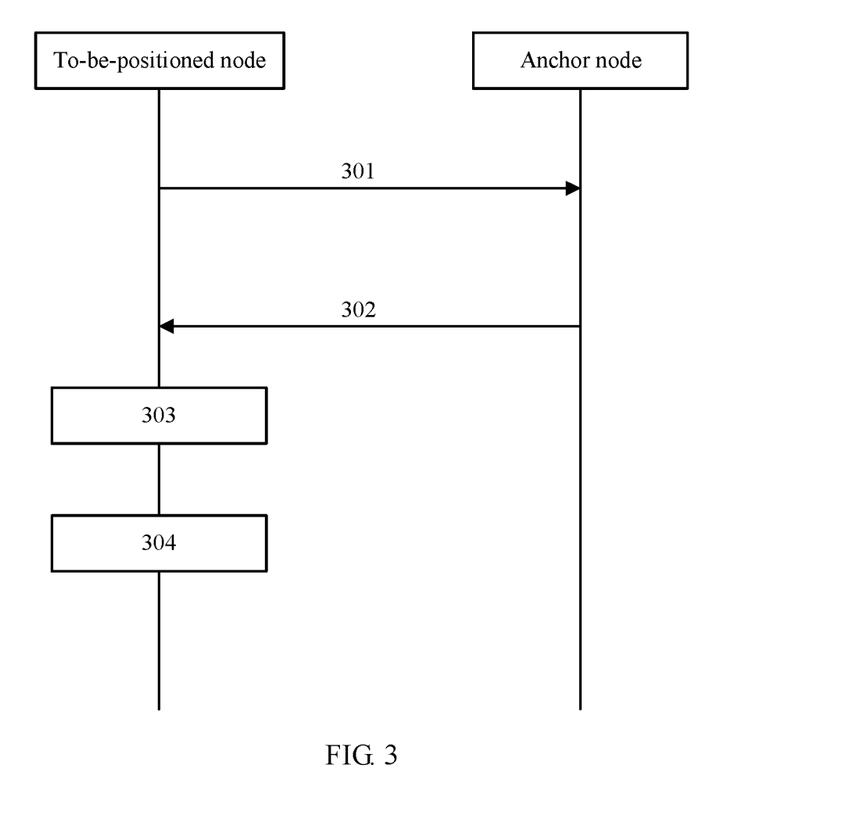
FIG. 3 is a flowchart of a wireless network-based positioning method according to an embodiment of the present disclosure.

FIG. 3 is a flowchart of a wireless network-based positioning method according to an embodiment of the present disclosure. As shown in FIG. 3, the positioning method is performed by a to-be-positioned node, and a specific process of the positioning method is as follows:

301: The to-be-positioned node sends, at a current location, a sounding signal to anchor nodes.

302: The to-be-positioned node receives time information sent by the anchor nodes, where the time information records times of arrival of the sounding signal at the anchor nodes.

303: The to-be-positioned node calculates the current location of the to-be-positioned node according to historical information and the time information.

304: The to-be-positioned node saves information about the current location.

In step 301, the to-be-positioned node may send the sounding signal to the anchor nodes by means of broadcast. It should be understood that herein, the to-be-positioned node may send the sounding signal to multiple anchor nodes. To position the to-be-positioned node, there should be at least three anchor nodes.

In step 302, the to-be-positioned node may receive time information sent by all anchor nodes, and record the time information. If the to-be-positioned node has not received the time information sent by all the anchor nodes within a particular time, the to-be-positioned node may resend the sounding signal, and then receive again the time information sent by the anchor nodes. In addition, in step 302, the to-be-positioned node may sequentially receive the time information sent by the multiple anchor nodes, or may simultaneously receive the time information sent by the multiple anchor nodes. Alternatively, the to-be-positioned node may receive time information sent by a primary anchor node of the multiple anchor nodes. In this case, the time information sent by the primary anchor node includes a time of arrival of the sounding signal at each of the multiple anchor nodes.

In step 303, the to-be-positioned node records locations of all the anchor nodes and a historical location of the to-be-positioned node. The to-be-positioned node may calculate time differences of arrival of the current sounding signal at different anchor nodes according to the recorded locations of the anchor nodes, the historical location at which the to-be-positioned node sends a previous sounding signal, times of arrival of the sounding signal at the different anchor nodes, and times of arrival of the previous sounding signal at the different anchor nodes, and then calculate the current location of the to-be-positioned node according to the time differences.

In step 304, after calculating the current location of the to-be-positioned node, the to-be-positioned node saves the information about the current location, so that the to-be-positioned node displays the current location in real time, or sends the information about the current location to another device.

Optionally, in another embodiment, the positioning method may be further performed by a third-party device other than the to-be-positioned node. In this case, the positioning method further includes: receiving, by the third-party device, the time information fed back by the at least three anchor nodes; and sending, by the third-party device, the determined current location to the to-be-positioned node. It should be understood that the third-party device may be a device located on an anchor node side, or may be a serving device independent of an anchor node side. The third-party device may directly send the determined current location to the to-be-positioned node, or may first send the information about the current location to the anchor nodes, and then the anchor nodes send the information about the current location to the to-be-positioned node.

Figure 4:
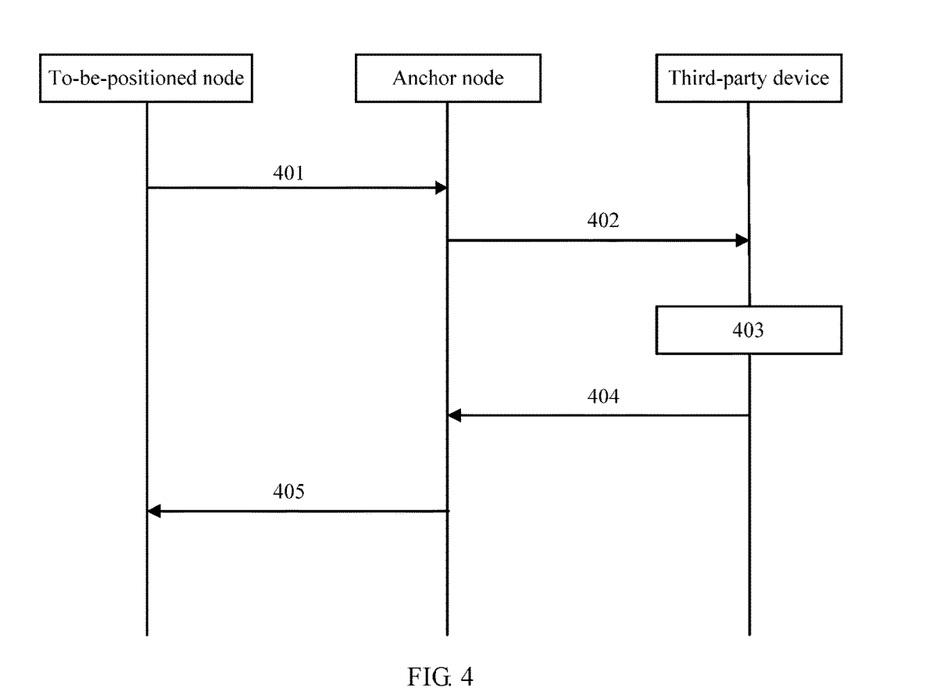
FIG. 4 is a flowchart of a wireless network-based positioning method according to an embodiment of the present disclosure.

FIG. 4 is a flowchart of a wireless network-based positioning method according to an embodiment of the present disclosure. As shown in FIG. 4, the positioning method is performed by a third-party device, and a specific process of the positioning method is as follows:

401: A to-be-positioned node sends, at a current location, a sounding signal to anchor nodes.

402: The third-party device receives time information sent by the anchor nodes, where the time information records times of arrival of the sounding signal at the anchor nodes.

403: The third-party device calculates the current location of the to-be-positioned node according to historical information and the time information.

404: The third-party device sends information about the current location of the to-be-positioned node to the anchor nodes.

405: The anchor nodes send the information about the current location of the to-be-positioned node to the to-be-positioned node.

In step 401, the to-be-positioned node may send the sounding signal to the anchor nodes by means of broadcast. It should be understood that herein, the to-be-positioned node sends the sounding signal to multiple anchor nodes. To position the to-be-positioned node, there should be at least three anchor nodes.

In step 402, the third-party device may receive time information sent by all anchor nodes, and record the time information. In addition, the third-party device may sequentially receive the time information sent by the multiple anchor nodes, or may simultaneously receive the time information sent by the multiple anchor nodes. Alternatively, the third-party device may receive time information sent by a primary anchor node of the multiple anchor nodes. In this case, the time information sent by the primary anchor node includes a time of arrival of the sounding signal at each of the multiple anchor nodes.

In step 403, the third-party device records locations of all the anchor nodes and a historical location of the to-be-positioned node. The third-party device may calculate time differences of arrival of the current sounding signal at different anchor nodes according to the recorded locations of the anchor nodes, the historical location at which the to-be-positioned node sends a previous sounding signal, times of arrival of the sounding signal at the different anchor nodes, and times of arrival of the previous sounding signal at the different anchor nodes, and then calculate the current location of the to-be-positioned node according to the time differences.

In step 404, the third-party device may send the information about the current location of the to-be-positioned node to all the anchor nodes, or may send the information about the current location of the to-be-positioned node to the primary anchor node of the anchor nodes. After receiving the information about the current location, the anchor nodes may send the information about the current location to the to-be-positioned node.

In step 405, it may be that all of the multiple anchor nodes send the information about the current location of the to-be-positioned node to the to-be-positioned node, or it may be that the primary anchor node of the multiple anchor nodes sends the information about the current location of the to-be-positioned node to the to-be-positioned node. If the to-be-positioned node has not received, within a particular time, the information that is about the current location of the to-be-positioned node and that is sent by the anchor nodes, the to-be-positioned node may resend the sounding signal and then repositioning is performed by repeating the foregoing process.

Optionally, in an embodiment, a time of arrival of a first sounding signal at any one of the at least three anchor nodes may be calculated based on a time at which the any anchor node obtains the first sounding signal and a time period required for radio frequency processing and baseband processing of the any anchor node. Specifically, a time of arrival of the first sounding signal at an anchor node may be a difference between a time at which the anchor node actually obtains the first sounding signal and a time period during which the anchor node performs radio frequency processing and baseband processing on the first sounding signal. Because the time period for the radio frequency processing and the baseband processing is a local processing time of the anchor node, relatively accurate estimation can be provided. In this way, a time of arrival of the first sounding signal at a first anchor node may be relatively accurately obtained.

It should be understood that when the to-be-positioned node is initially positioned, an initial location of the to-be-positioned node needs to be first obtained. The initial location may be obtained by using another positioning method. For example, the initial location of the to-be-positioned node may be obtained by means of initial positioning by using a Global Positioning System (GPS) technology, or the initial location of the to-be-positioned node may be obtained by using a fingerprint positioning method, or the initial location of the to-be-positioned node may be obtained by using a cell ID.

Optionally, in an embodiment, when a positioning result is not accurate because the initial location of the to-be-positioned node or a location at a moment is used as an estimation location, a calibration method may be used to calibrate the current location of the to-be-positioned node. For ease of description of the calibration method, the following agreements are made: A first positioning cycle is a current positioning cycle; the to-be-positioned node sends a sounding signal S' to anchor nodes within the first positioning cycle and sends a sounding signal S to the anchor nodes within a second positioning cycle, where the second positioning cycle is a previous positioning cycle of the first positioning cycle, a location at which the to-be-positioned node sends the sounding signal S is $L_{S1}$, and a location at which the to-be-positioned node sends the sounding signal S' is $L_{S'1}$. Specific steps of the calibration method are as follows:

(1) Calculate, according to the location $L_{S1}$ at which the to-be-positioned node sends the sounding signal S, the location $L_{S'1}$ at which the to-be-positioned node sends the sounding signal S'.

(2) Calculate, according to the location $L_{S'1}$ at which the to-be-positioned node sends the sounding signal S', the location $L_{S1}$ at which the to-be-positioned node sends the sounding signal S.

Step (1) and step (2) are performed repeatedly. That is, a result calculated in step (1) is substituted into step (2), and a result obtained in step (2) is substituted into step (1). By means of repeated iterations, locations $L_{S'1}$, $L_{S'2}$, $L_{S'3}$, $L_{S'4}$, and the like at which the to-be-positioned node sends the sounding signal S' within the first positioning cycle may be calculated. If these pieces of data have a convergence value, the convergence value may be considered as a real location at which the to-be-positioned node sends the sounding signal S', thereby calibrating a positioning result. It should be understood that the calibration process is completed within an extremely short time. That is, the calibration process may be completed within the second positioning cycle. Positioning accuracy of the positioning method can be further improved by means of location calibration.

In this embodiment of the present disclosure, the time differences of arrival of the sounding signal, sent by the to-be-positioned node, at the different anchor nodes can be accurately determined according to the times of arrival of the sounding signal at the different anchor nodes and the historical information of the to-be-positioned node, thereby determining the location of the to-be-positioned node. Compared with the prior art in which accurate positioning can be implemented only by ensuring strict synchronization between anchor nodes, accurate positioning can be performed by using TDOAs when the anchor nodes are asynchronous.

The wireless network-based positioning methods according to the embodiments of the present disclosure are detailed above with reference to FIG. 1 to FIG. 4, and wireless network-based positioning apparatuses according to embodiments of the present disclosure are detailed below with reference to FIG. 5 and FIG. 6. It should be understood that the positioning apparatuses in FIG. 5 and FIG. 6 can perform the steps of the methods in FIG. 1 to FIG. 4. To avoid repetition, details are not described herein again.

Figure 5:
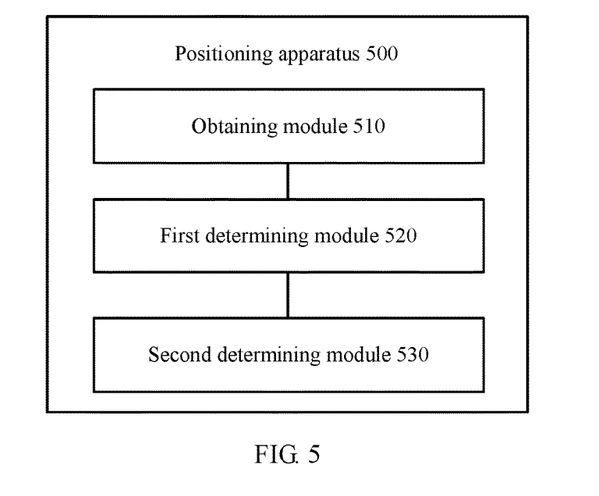
FIG. 5 is a schematic block diagram of a wireless network-based positioning apparatus according to an embodiment of the present disclosure.

FIG. 5 is a schematic block diagram of a wireless network-based positioning apparatus according to an embodiment of the present disclosure. The positioning apparatus 500 in FIG. 5 includes:

an obtaining module 510, configured to obtain time information used for determining a current location of a to-be-positioned node, where the time information records times of arrival of a first sounding signal at at least three anchor nodes, and the first sounding signal is sent by the to-be-positioned node at the current location;

a first determining module 520, configured to determine time differences of arrival of the first sounding signal at the at least three anchor nodes according to recorded historical information and the time information, where the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is previously sent by the to-be-positioned node; and a second determining module 530, configured to determine the current location of the to-be-positioned node according to the locations of the at least three anchor nodes and the time differences of arrival of the first sounding signal at the at least three anchor nodes.

In this embodiment of the present disclosure, the time differences of arrival of the sounding signal, sent by the to-be-positioned node, at the different anchor nodes can be accurately determined according to the times of arrival of the sounding signal at the different anchor nodes and the historical information of the to-be-positioned node, thereby determining a location of the to-be-positioned node. Compared with the prior art in which accurate positioning can be implemented only by ensuring strict synchronization between anchor nodes, accurate positioning can be performed by using TDOAs when the anchor nodes are asynchronous.

Optionally, in an embodiment, the first determining module 520 is specifically configured to: determine distances between the to-be-positioned node at the historical location and the at least three anchor nodes according to the historical location and the locations of the at least three anchor nodes; and determine a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

where $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the to-be-positioned node at the historical location and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

Optionally, in an embodiment, the first determining module 520 is specifically configured to: determine the current location of the to-be-positioned node according to formulas $$\begin{cases} \sqrt{(x-x_A)^2 + (y-y_A)^2} - \sqrt{(x-x_B)^2 + (y-y_B)^2} = c \cdot T_{AB} \\ \sqrt{(x-x_B)^2 + (y-y_B)^2} - \sqrt{(x-x_C)^2 + (y-y_C)^2} = c \cdot T_{BC} \end{cases},$$

where $(x_A, y_A)$, $(x_B, y_B)$, and $(x_C, Y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, (x, y) represents the current location of the to-be-positioned node, and c represents the propagation velocity of the sounding signal sent by the to-be-positioned node.

Optionally, in an embodiment, the positioning apparatus 500 is the to-be-positioned node, and the positioning apparatus 500 further includes a transmission module; the transmission module is configured to send the first sounding signal to the at least three anchor nodes; and the obtaining module is specifically configured to receive the time information fed back by the at least three anchor nodes.

Optionally, in an embodiment, the positioning apparatus 500 is a third-party device other than the to-be-positioned node, and the positioning apparatus 500 further includes a transmission module; the obtaining module is specifically configured to receive the time information fed back by the at least three anchor nodes; and the transmission module is configured to send the determined current location to the to-be-positioned node.

Optionally, in an embodiment, a time of arrival of the first sounding signal at any one of the at least three anchor nodes is calculated based on a time at which the any anchor node obtains the first sounding signal and a time period required for radio frequency processing and baseband processing of the any anchor node.

Figure 6:
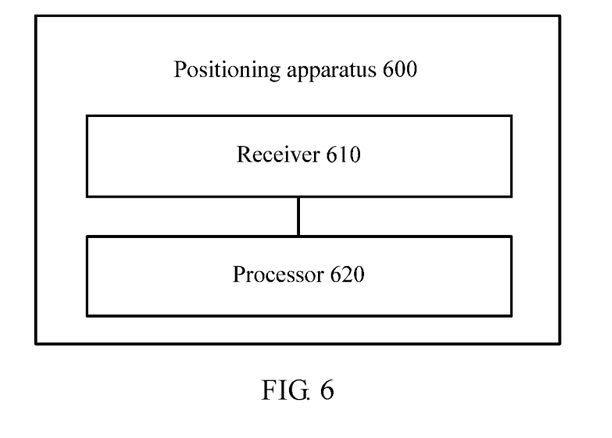
FIG. 6 is a schematic block diagram of a wireless network-based positioning apparatus according to an embodiment of the present disclosure.

FIG. 6 is a schematic block diagram of a wireless network-based positioning apparatus according to an embodiment of the present disclosure. The positioning apparatus 600 in FIG. 6 includes a receiver 610 and a processor 620.

The receiver 610 is configured to obtain time information used for determining a current location of a to-be-positioned node, where the time information records times of arrival of a first sounding signal at at least three anchor nodes, and the first sounding signal is sent by the to-be-positioned node at the current location.

The processor 620 is configured to: determine time differences of arrival of the first sounding signal at the at least three anchor nodes according to recorded historical information and the time information, where the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is previously sent by the to-be-positioned node; and determine the current location of the to-be-positioned node according to the locations of the at least three anchor nodes and the time differences of arrival of the first sounding signal at the at least three anchor nodes.

In this embodiment of the present disclosure, the time differences of arrival of the sounding signal, sent by the to-be-positioned node, at the different anchor nodes can be accurately determined according to the times of arrival of the sounding signal at the different anchor nodes and the historical information of the to-be-positioned node, thereby determining a location of the to-be-positioned node. Compared with the prior art in which accurate positioning can be implemented only by ensuring strict synchronization between anchor nodes, accurate positioning can be performed by using TDOAs when the anchor nodes are asynchronous.

Optionally, in an embodiment, the processor 620 is specifically configured to: determine distances between the to-be-positioned node at the historical location and the at least three anchor nodes according to the historical location and the locations of the at least three anchor nodes; and determine a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

where $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the to-be-positioned node at the historical location and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

Optionally, in an embodiment, the processor 620 is specifically configured to: determine the current location of the to-be-positioned node according to formulas $$\begin{cases} \sqrt{(x-x_A)^2 + (y-y_A)^2} - \sqrt{(x-x_B)^2 + (y-y_B)^2} = c \cdot T_{AB} \\ \sqrt{(x-x_B)^2 + (y-y_B)^2} - \sqrt{(x-x_C)^2 + (y-y_C)^2} = c \cdot T_{BC} \end{cases},$$

where $(x_A, y_A)$, $(x_B, y_B)$, and $(x_C, y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, (x, y) represents the current location of the to-be-positioned node, and c represents the propagation velocity of the sounding signal sent by the to-be-positioned node.

Optionally, in an embodiment, the positioning apparatus 600 is the to-be-positioned node, and the positioning apparatus 600 further includes a transmitter; the transmitter is configured to send the first sounding signal to the at least three anchor nodes; and the receiver is specifically configured to receive the time information fed back by the at least three anchor nodes.

Optionally, in an embodiment, the positioning apparatus 600 is a third-party device other than the to-be-positioned node, and the positioning apparatus 600 further includes a transmitter; the receiver 610 is specifically configured to receive the time information fed back by the at least three anchor nodes; and the transmitter is configured to send the determined current location to the to-be-positioned node.

Optionally, in an embodiment, a time of arrival of the first sounding signal at any one of the at least three anchor nodes is estimated based on a time at which the any anchor node obtains the first sounding signal and a time period required for radio frequency processing and baseband processing of the any anchor node.

It should be understood that the wireless network-based positioning methods and positioning apparatuses in the embodiments of the present disclosure can be applied to not only a WLAN network but also all other asynchronous wireless networks.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless network-based positioning method, comprising:

obtaining time information used for determining a current location of a to-be-positioned node, wherein the time information records times of arrival of a first sounding signal at at least three anchor nodes, and the first sounding signal is sent by the to-be-positioned node at the current location;

determining time differences of arrival of the first sounding signal at the at least three anchor nodes according to recorded historical information and the time information, wherein the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is sent by the to-be-positioned node before the to-be-positioned node sends the first sounding signal; and determining the current location of the to-be-positioned node according to the locations of the at least three anchor nodes and the time differences of arrival of the first sounding signal at the at least three anchor nodes, wherein the determining the current location of the to-be-positioned node according to the locations of the at least three anchor nodes and the time differences of arrival of the first sounding signal at the at least three anchor nodes comprises:

determining the current location of the to-be-positioned node according to formulas $$\begin{cases} \sqrt{(x-x_A)^2 + (y-y_A)^2} - \sqrt{(x-x_B)^2 + (y-y_B)^2} = c \cdot T_{AB} \\ \sqrt{(x-x_B)^2 + (y-y_B)^2} - \sqrt{(x-x_C)^2 + (y-y_C)^2} = c \cdot T_{BC} \end{cases},$$

wherein $(x_A, y_A)$, $(x_B, y_B)$, and $(x_C, y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, $(x, y)$ represents the current location of the to-be-positioned node, and c represents the propagation velocity of the sounding signal sent by the to-be-positioned node.

2. The positioning method according to claim 1, wherein the determining time differences of arrival of the first sounding signal at the at least three anchor nodes according to recorded historical information and the time information comprises:
  determining distances between the to-be-positioned node at the historical location and the at least three anchor nodes according to the historical location and the locations of the at least three anchor nodes; and
  determining a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

wherein $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the location at which the to-be-positioned node sends the second sounding signal and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

3. The positioning method according to claim 1, wherein the positioning method is performed by the to-be-positioned node, and the positioning method further comprises:
  sending, by the to-be-positioned node, the first sounding signal to the at least three anchor nodes; and
  the obtaining time information used for determining a current location of a to-be-positioned node comprises:
  receiving, by the to-be-positioned node, the time information fed back by the at least three anchor nodes.

4. The positioning method according to claim 1, wherein the positioning method is performed by a third-party device other than the to-be-positioned node, and the obtaining time information used for determining a current location of a to-be-positioned node comprises:
  receiving, by the third-party device, the time information fed back by the at least three anchor nodes; and
  the positioning method further comprises:
  sending, by the third-party device, the determined current location to the to-be-positioned node.

5. The positioning method according to claim 1, wherein a time of arrival of the first sounding signal at any one of the at least three anchor nodes is calculated based on a time at which the any anchor node obtains the first sounding signal and a time period required for radio frequency processing and baseband processing of the any anchor node.

6. A wireless network-based positioning apparatus, comprising:
  an obtaining module, configured to obtain time information used for determining a current location of a to-be-positioned node, wherein the time information records times of arrival of a first sounding signal at at least three anchor nodes, and the first sounding signal is sent by the to-be-positioned node at the current location;
  a first determining module, configured to determine time differences of arrival of the first sounding signal at the at least three anchor nodes according to recorded historical information and the time information, wherein the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is previously sent by the to-be-positioned node; and
  a second determining module, configured to determine the current location of the to-be-positioned node according to the locations of the at least three anchor nodes and the time differences of arrival of the first sounding signal at the at least three anchor nodes, wherein the second determining module is further configured to:
  determine the current location of the to-be-positioned node according to formulas $$\begin{cases} \sqrt{(x-x_A)^2 + (y-y_A)^2} - \sqrt{(x-x_B)^2 + (y-y_B)^2} = c \cdot T_{AB} \\ \sqrt{(x-x_B)^2 + (y-y_B)^2} - \sqrt{(x-x_C)^2 + (y-y_C)^2} = c \cdot T_{BC} \end{cases},$$

wherein $(x_A, y_A)$, $(x_B, y_B)$, and $(x_C, y_C)$ respectively represent locations of a first anchor node, a second anchor node, and a third anchor node in the at least three anchor nodes, $T_{AB}$ represents a time difference of arrival of the first sounding signal at the first anchor node and the second anchor node, $T_{BC}$ represents a time difference of arrival of the first sounding signal at the second anchor node and the third anchor node, (x, y) represents the current location of the to-be-positioned node, and c represents the propagation velocity of the sounding signal sent by the to-be-positioned node.

7. The positioning apparatus according to claim 6, wherein the first determining module is configured to:
  determine distances between the to-be-positioned node at the historical location and the at least three anchor nodes according to the historical location and the locations of the at least three anchor nodes; and
  determine a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

wherein $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the to-be-positioned node at the historical location and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

8. The positioning apparatus according to claim 6, wherein the positioning apparatus is the to-be-positioned node, and the positioning apparatus further comprises a transmission module;
  the transmission module is configured to send the first sounding signal to the at least three anchor nodes; and the obtaining module is configured to receive the time information fed back by the at least three anchor nodes.

9. The positioning apparatus according to claim 6, wherein the positioning apparatus is a third-party device other than the to-be-positioned node, and the positioning apparatus further comprises a transmission module;
the obtaining module is configured to receive the time information fed back by the at least three anchor nodes; and
the transmission module is configured to send the determined current location to the to-be-positioned node.

10. The positioning apparatus according to claim 6, wherein a time of arrival of the first sounding signal at any one of the at least three anchor nodes is calculated based on a time at which the any anchor node obtains the first sounding signal and a time period required for radio frequency processing and baseband processing of the any anchor node.

11. A wireless network-based positioning apparatus, comprising:
a receiver, configured to obtain time information used for determining a current location of a to-be-positioned node, wherein the time information records times of arrival of a first sounding signal at at least three anchor nodes, and the first sounding signal is sent by the to-be-positioned node at the current location; and
a processor, configured to determine time differences of arrival of the first sounding signal at the at least three anchor nodes according to recorded historical information and the time information, wherein the time differences of arrival of the first sounding signal at the at least three anchor nodes are differences between the times of arrival of the first sounding signal at the at least three anchor nodes, the historical information records locations of the at least three anchor nodes, a historical location at which the to-be-positioned node sends a second sounding signal, and times of arrival of the second sounding signal at the at least three anchor nodes, and the second sounding signal is a sounding signal that is used for positioning and that is previously sent by the to-be-positioned node, wherein
the processor is further configured to determine the current location of the to-be-positioned node according to the locations of the at least three anchor nodes and the time differences of arrival of the first sounding signal at the at least three anchor nodes,
and wherein the processor is further configured to:
determine the current location of the to-be-positioned node according to formulas $$\begin{cases} \sqrt{(x-x_A)^2+(y-y_A)^2} - \sqrt{(x-x_B)^2+(y-y_B)^2} = c \cdot T_{AB} \\ \sqrt{(x-x_B)^2+(y-y_B)^2} - \sqrt{(x-x_C)^2+(y-y_C)^2} = c \cdot T_{BC} \end{cases},$$

wherein $(x_A, y_A)$, $(x_B, y_B)$, and $(x_C, y_C)$ respectively represent locations of a first anchor node, a second anchor node, and a third anchor node in the at least three anchor nodes, $T_{AB}$ represents a time difference of arrival of the first difference of arrival of the first sounding signal at the second anchor node and the third anchor node, (x, y) represents the current location of the to-be-positioned node, and c represents the propagation velocity of the sounding signal sent by the to-be-positioned node.

12. The positioning apparatus according to claim 11, wherein the processor is configured to:
determine distances between the to-be-positioned node at the historical location and the at least three anchor nodes according to the historical location and the locations of the at least three anchor nodes; and
determine a time difference of arrival of the first sounding signal at any two of the at least three anchor nodes according to a formula $$T_{AB} = \frac{1}{c}(L_B - L_A) + (T_{B3} - T_{B1}) - (T_{A3} - T_{A1}),$$

wherein $T_{AB}$ represents the time difference of arrival of the first sounding signal at the any two of the at least three anchor nodes, c represents a propagation velocity of a sounding signal sent by the to-be-positioned node, $L_A$ and $L_B$ respectively represent distances between the to-be-positioned node at the historical location and the two anchor nodes, $T_{A1}$ and $T_{B1}$ respectively represent times of arrival of the second sounding signal at the two anchor nodes, and $T_{A3}$ and $T_{B3}$ respectively represent times of arrival of the first sounding signal at the two anchor nodes.

13. The positioning apparatus according to claim 11, wherein the positioning apparatus is the to-be-positioned node, and the positioning apparatus further comprises a transmitter;
the transmitter is configured to send the first sounding signal to the at least three anchor nodes; and
the receiver is configured to receive the time information fed back by the at least three anchor nodes.

14. The positioning apparatus according to claim 11, wherein the positioning apparatus is a third-party device other than the to-be-positioned node, and the positioning apparatus further comprises a transmitter;
the receiver is configured to receive the time information fed back by the at least three anchor nodes; and
the transmitter is configured to send the determined current location to the to-be-positioned node.

15. The positioning apparatus according to claim 11, wherein a time of arrival of the first sounding signal at any one of the at least three anchor nodes is calculated based on a time at which the any anchor node obtains the first sounding signal and a time period required for radio frequency processing and baseband processing of the any anchor node.

* * * * *